(12) United States Patent
Chellappa

(10) Patent No.: US 11,027,849 B1
(45) Date of Patent: Jun. 8, 2021

(54) PORTABLE LEG LIFT DEVICE FOR AN AIRPLANE SEAT

(71) Applicant: Srinivasan Chellappa, Plano, TX (US)

(72) Inventor: Srinivasan Chellappa, Plano, TX (US)

( * ) Notice: Subject to any disclaimer, the term of this patent is extended or adjusted under 35 U.S.C. 154(b) by 0 days.

(21) Appl. No.: 16/985,032

(22) Filed: Aug. 4, 2020

(51) Int. Cl.
  *B64D 11/06* (2006.01)
  *A47C 7/52* (2006.01)

(52) U.S. Cl.
  CPC ............ *B64D 11/0643* (2014.12); *A47C 7/52* (2013.01)

(58) Field of Classification Search
  CPC .............................. A47C 7/52; B64D 11/0643
  USPC .................................................... 297/DIG. 8
  See application file for complete search history.

(56) References Cited

U.S. PATENT DOCUMENTS

| | | | | |
|---|---|---|---|---|
| 5,408,710 A | * | 4/1995 | Garman | A47C 7/52 297/423.3 |
| 5,505,518 A | * | 4/1996 | Pike | A61G 5/14 297/242 |
| 5,918,936 A | * | 7/1999 | Murphy | A61G 5/14 297/313 |

* cited by examiner

*Primary Examiner* — Anthony D Barfield
(74) *Attorney, Agent, or Firm* — Ivan E. Rozek; Savantek Patent Services

(57) ABSTRACT

A portable leg lift device for an airplane seat with a seat panel, a movable leg lift panel, a stationary panel, an inflatable chamber, an inflation tube, an outer foldable outer panel and a inner foldable panel. The outer foldable panel is attached to the seat panel and the movable leg lift panel. The inner foldable panel is attached to the stationary panel. The inner foldable panel is also attached to the outer foldable panel. The inflatable chamber is attached on its distal surface to the inner wall of the movable leg lift panel and on its proximal surface to the stationary panel. The seat panel rests on the surface of an airplane seat. The inflation chamber can be inflated thereby lifting the movable leg panel and raising the lower legs of a person sitting on the seat panel.

8 Claims, 7 Drawing Sheets

PORTABLE LEG LIFT DEVICE FOR AN AIRPLANE SEAT

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of portable seating accessories and more specifically to a portable leg lift device for an airplane seat.

Commercial airplanes passengers are often required to sit in a relatively upright position with lower legs, below the knee at approximately ninety degrees in relation to the upper legs above the knee. This is especially true for short people whose feet may not touch the ground while seated. Sitting in this position for extended periods of time can feel restricting and can also lead to deep vein thrombosis, or blood clots in the legs.

Some business class and first-class airplane seats include a built-in leg lifting panel that can lift the passenger's lower legs so that they are at a more comfortable angle while lowering the risk of blood clots or deep vein thrombosis.

Passenger in airplane seat that does not have such a built-in leg lifting panel have no choice but to sit with his or her lower legs at a ninety-degree angle.

BRIEF SUMMARY OF THE INSTANT INVENTION

The primary object of the instant invention is to provide a portable leg lift device for an airplane seat that allows the user to have his or her lower legs supported at an angle.

Another object of the instant invention is to provide a portable leg lift device for an airplane seat that can provide an adjustable leg rest angle depending on the degree of inflation of an inflatable air chamber.

Another object of the instant invention is to provide a portable leg lift device for an airplane seat that can fold relatively flat when not in use.

Other objects and advantages of the instant invention will become apparent from the following descriptions, taken in connection with the accompanying drawings, wherein, by way of illustration and example, an embodiment of the instant invention is disclosed.

In accordance with a preferred embodiment, there is disclosed a portable leg lift device for an airplane seat comprising: a seat panel, a movable leg lift panel, a stationary panel, an inflatable chamber, an inflation tube, a large foldable over panel, a small foldable over panel, said large foldable over panel fixedly attached to said seat panel and said movable leg lift panel, said small foldable over panel fixedly attached to said stationary panel, said small foldable over panel also fixedly attached at one end to the center folding area of said large foldable panel, said inflatable chamber attached on its front surface to the inner wall of said movable leg lift panel and on its rear surface to said stationary panel, said inflation tube attached to an orifice in said inflatable chamber, said inflation tube's distal end removably covered by an air tight cap, said seat panel capable of resting on the surface of an airplane seat, said stationary panel capable of being in close contact with the front surface of a standard airplane seat, and said inflation chamber capable of being blown up creating a pushing means to rotatably lift said movable leg panel thereby raising the lower legs of a person sitting on said seat panel.

BRIEF DESCRIPTION OF THE DRAWINGS

The drawings constitute a part of this specification and include exemplary embodiments to the instant invention, which may be embodied in various forms. It is to be understood that in some instances various aspects of the instant embodiments may be shown exaggerated or enlarged to facilitate an understanding of the instant embodiment.

DETAILED DESCRIPTION OF THE PREFERRED EMBODIMENTS

Detailed descriptions of the preferred embodiment of the portable leg lift device are provided herein. It is to be understood, however, that the instant embodiment may be embodied in various forms. Therefore, specific details disclosed herein are not to be interpreted as limiting, but rather as a basis for the claims and as a representative basis for teaching one skilled in the art to employ the instant embodiment in virtually any appropriately detailed system, structure or manner.

Figure 1:
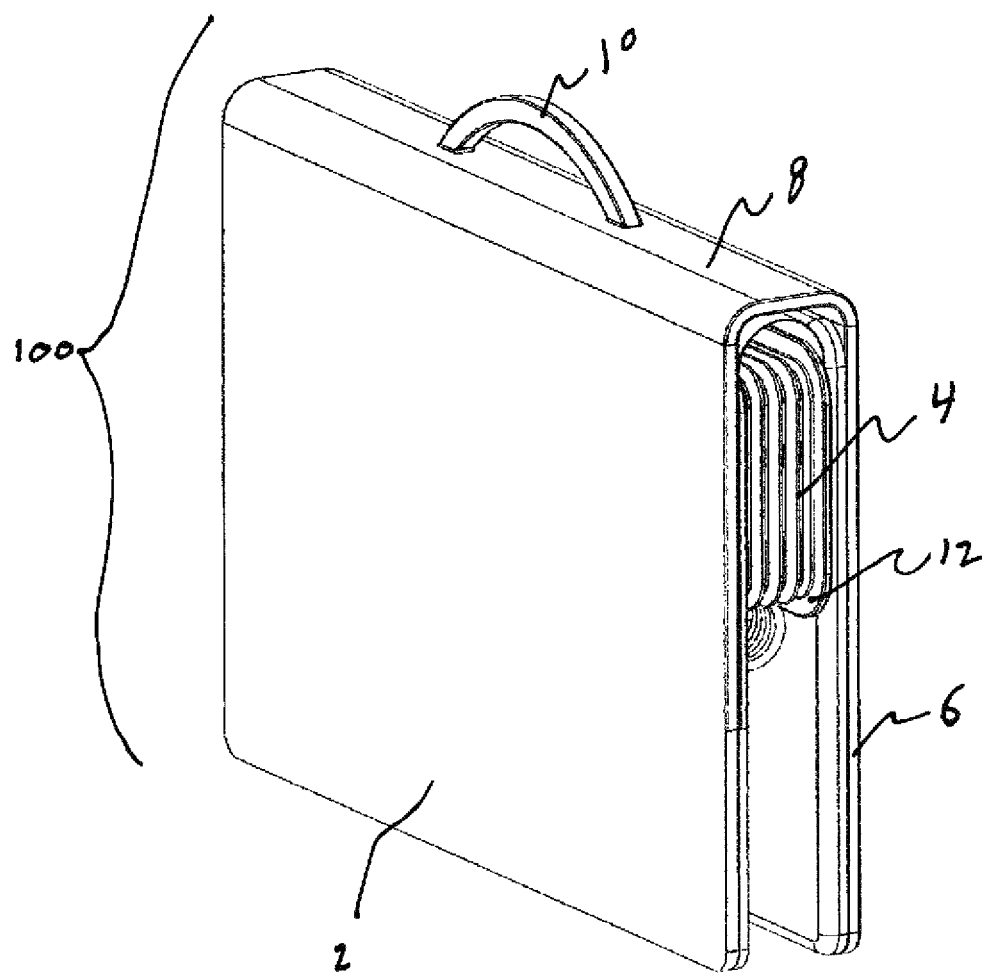
FIG. 1 is a perspective view of the instant embodiment in the closed position.

Referring now to FIG. 1 we see a perspective view of the present embodiment of the leg lifting device 100 in the closed position. The device 100 folds like a book. The leg lift panel 2 is the leg lift panel. The semi-rigid seat panel 6 is the panel that is placed on an airplane seat. Both the leg lift panel 2 and the seat panel 6 have a layer of resilient material mounted on them to increase the comfort level of the user, as implemented in the current embodiment. The inflatable chamber 4 is trapped between the leg lift panel 2 and a second, non-moving panel 12. A handle 10 on the outer foldable panel 8 portion of the instant embodiment 100 allows a user to easily carry the device 100 while traveling. The outer foldable panel portion 8 includes a sheet of flexible material that acts as a hinge connecting leg lift panel 2, outer foldable panel 8 and seat panel 6.

Figure 2:
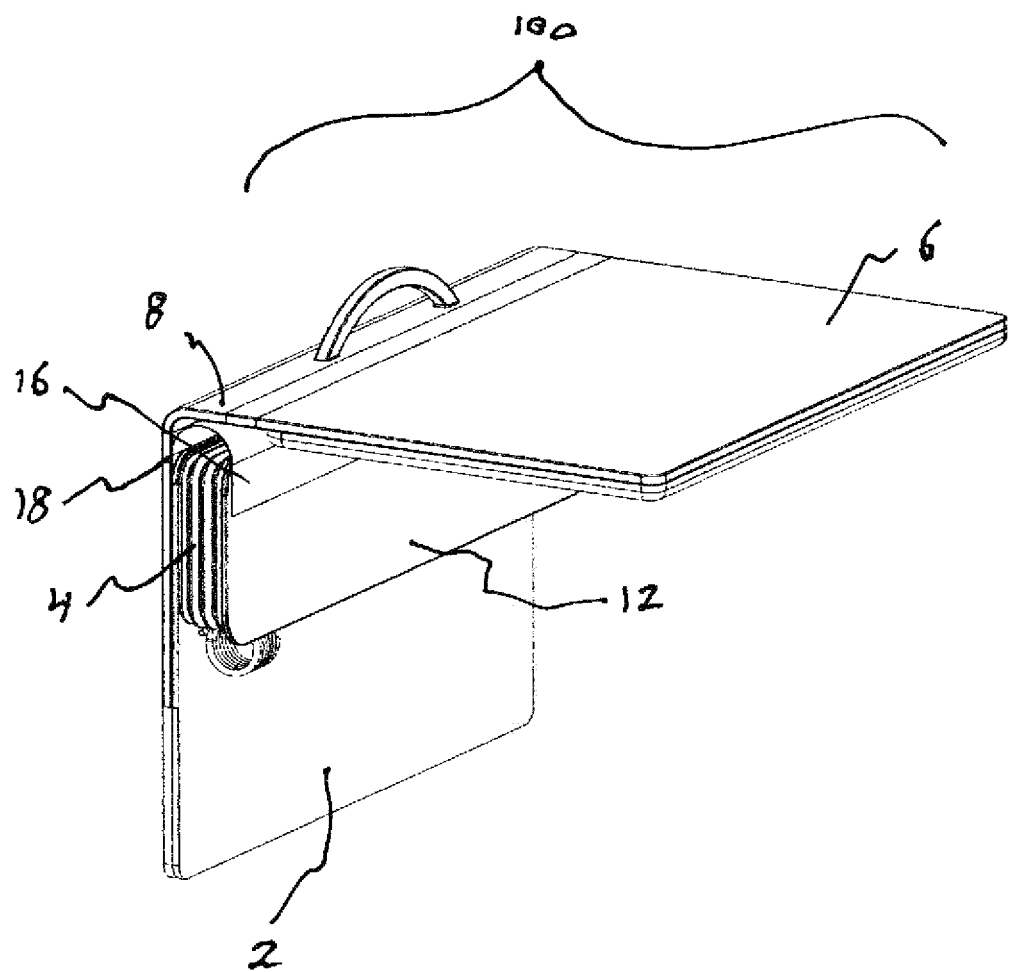
FIG. 2 is a perspective view of the instant embodiment in the open position.

FIG. 2 is a perspective view of the instant embodiment 100 with the semi-rigid seat panel 6 in the use position. Non-moving panel 12 is designed to abut the front portion of an airplane seat. An inner foldable panel 16 attaches to the leg lift panel at location 18. The front most portion of the inflatable chamber 4 is fixedly attached to the interior side of leg lift panel 2. Flexible inflation tube 14 is stored in its curled closed position. To inflate the inflatable chamber 4 the user can pull up on the inflation tube 14 to inflate the chamber 4 and then cap the tube with an airtight closure cap.

Figure 3:
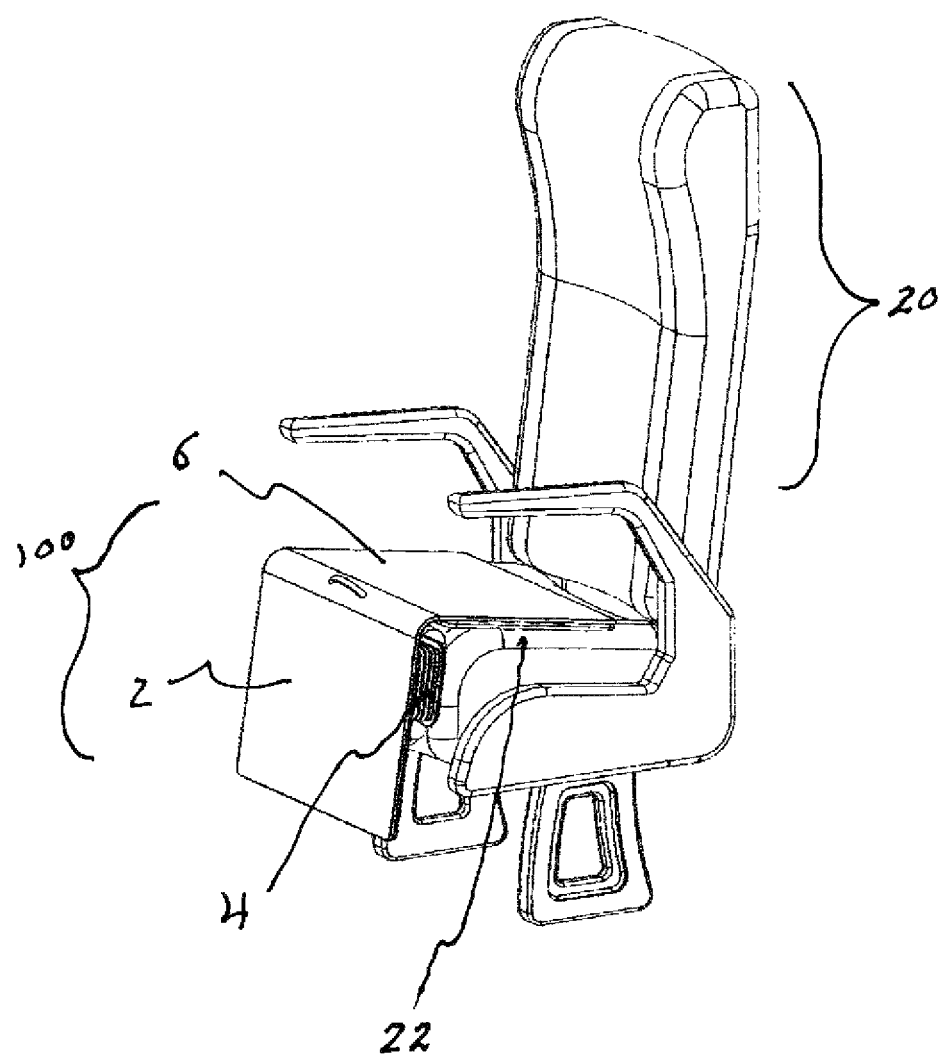
FIG. 3 is a perspective view of the instant embodiment mounted to an airplane seat.

FIG. 3 is a perspective view of an airplane seat 20 with the instant embodiment 100 mounted to the seat portion 22 of the airplane seat 20. The inflatable chamber 4 is trapped between the front of the airplane seat and the rear of the leg lift panel 2.

Figure 4:
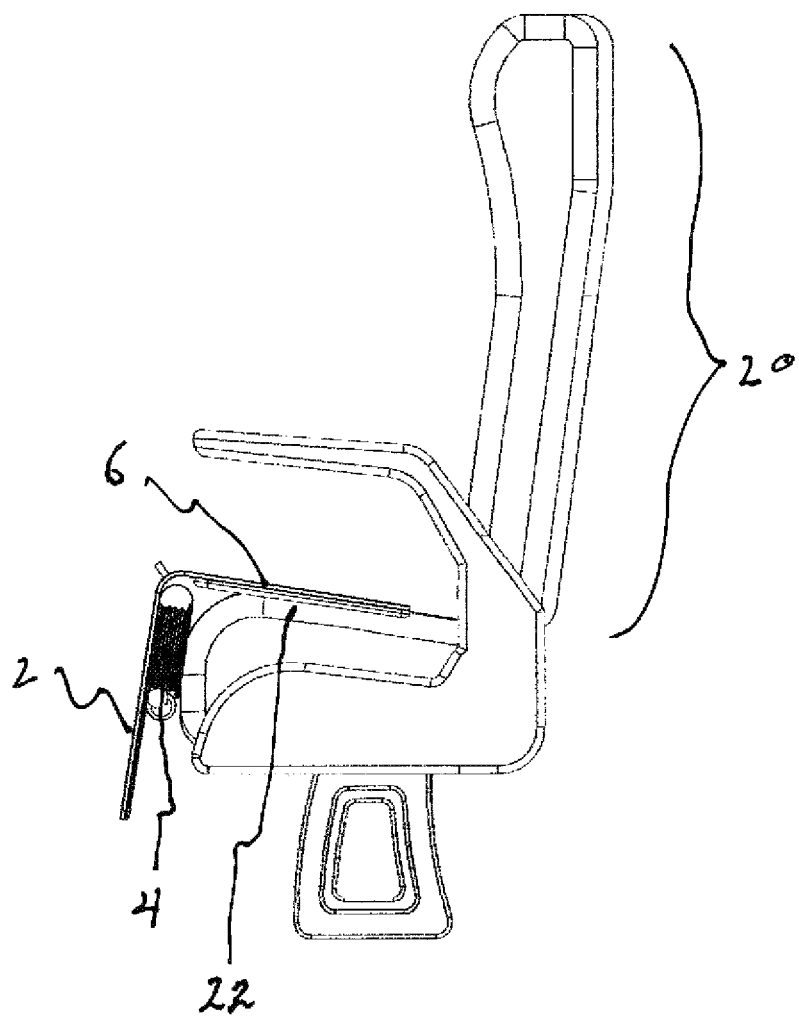
FIG. 4 is a side view of the instant embodiment mounted to an airplane seat.

FIG. 4 is a side view of the airplane seat with the instant embodiment 100 installed. The user's lower legs are meant to abut the exterior surface of the leg lift panel 2.

Figure 5:
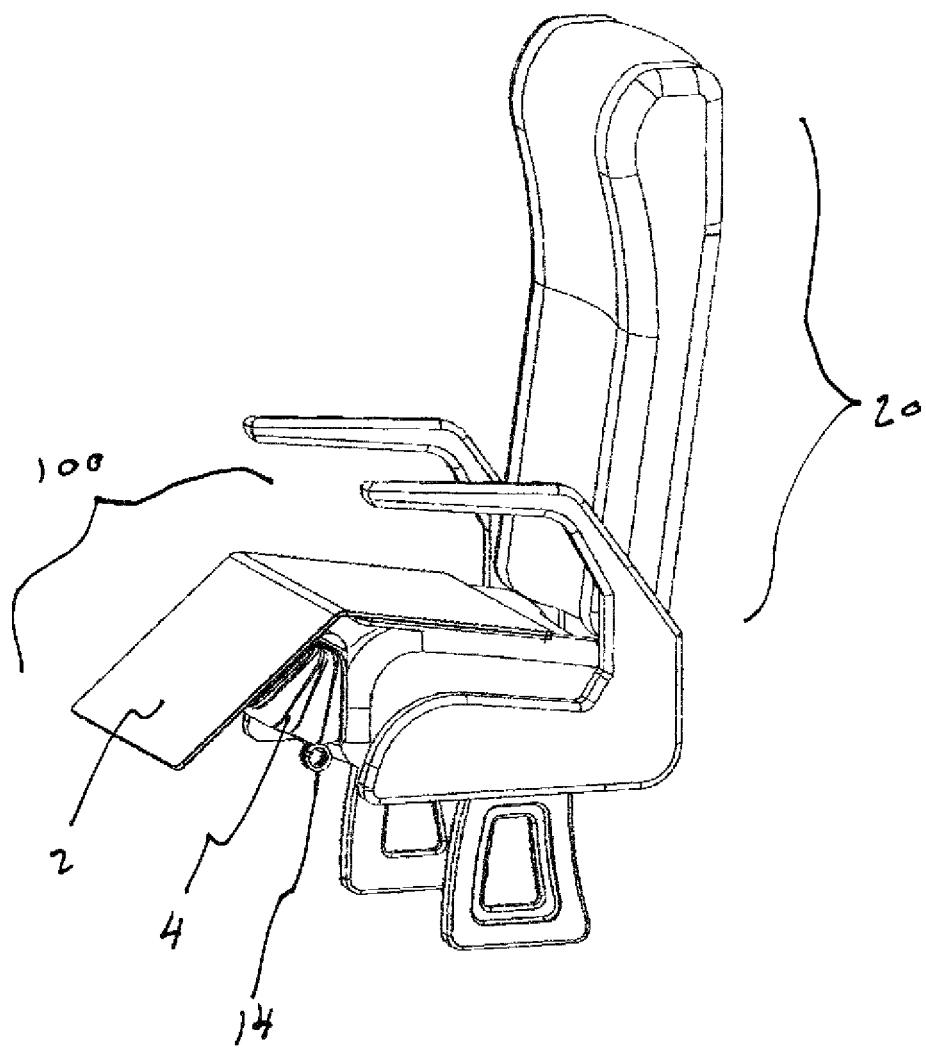
FIG. 5 is a perspective view of the instant embodiment with the air chamber inflated.

FIG. 5 us a perspective view showing the inflatable chamber 4 in the inflated position. The user can decide how much air to introduce into the chamber 4 which will affect the degree of lift of leg lift panel 2. In the present embodiment, the inflatable chamber 4 has an accordion or bellows design that allows the chamber to expand forward to a greater degree as opposed to a simple pillow shaped chamber. However, it should be noted that a pillow shaped chamber can also be used in an alternate embodiment.

Figure 6:
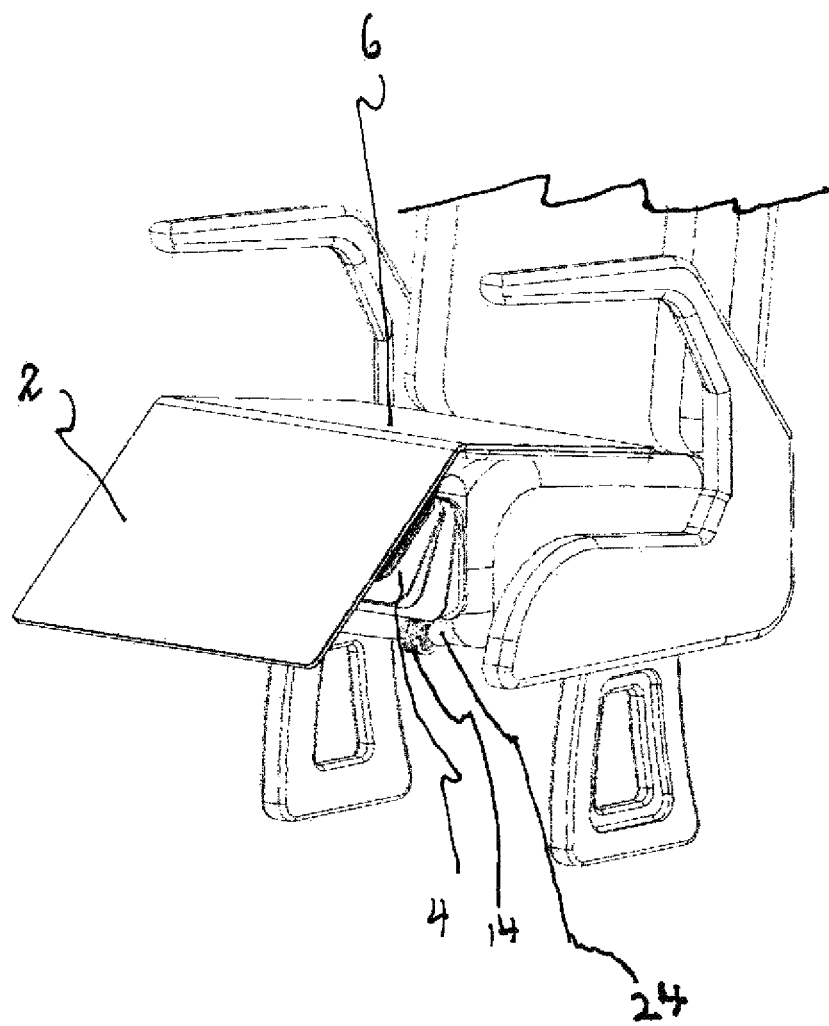
FIG. 6 is a partial perspective view of the instant embodiment with the air chamber inflated with air tube stored.

FIG. 6 is a partial perspective view of the instant embodiment 100 that clearly shows the bellows chamber 4 as well as the curled-up inflation tube 14 with additional optional rubber air pump 24 that can inflate the chamber 4 without the need to physically inflate the chamber 4 with the user's mouth.

Figure 7:
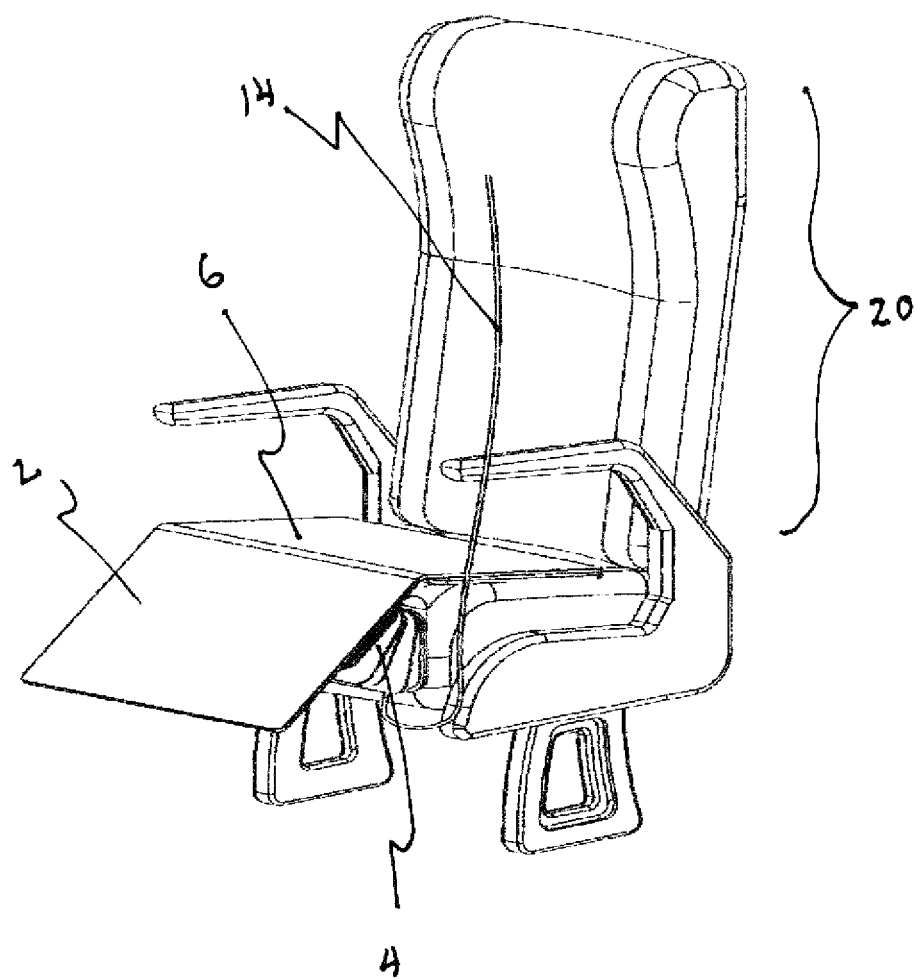
FIG. 7 is perspective view of the instant embodiment with the air tube extended for user inflation.

FIG. 7 is a perspective view of the instant embodiment 100 installed on an airplane seat 20 with the inflation tube 14 lifted to the height needed for a person to inflate the chamber 4 by mouth.

While the instant embodiment has been described in connection with a preferred embodiment, it is not intended to limit the scope of the instant embodiment to the particular form set forth, but on the contrary, it is intended to cover such alternatives, modifications, and equivalents as may be included within the spirit and scope of the embodiment as defined by the appended claims.

Definition

Proximal end and proximal surface being the end or the surface closer to the airplane seat;

Distal end and distal surface being the end or the surface farther from the airplane seat;

Airplane seat refers to an airplane's equipment provided to accommodate a passenger in a seated position;

Lower leg refers to a human passenger's leg segment below the passenger's knee.

What is claimed is:

1. A portable leg lift device for an airplane seat comprising:
   a seat panel;
   a movable leg lift panel, wherein the movable leg lift panel comprises an inner wall and an outer wall, the inner wall disposed closer to the airplane seat;
   a non-moving panel;
   an inflatable chamber, wherein the inflatable chamber comprises a front surface and a rear surface;
   an inflation tube, wherein the inflation tube comprises a proximal end attached to an orifice in the inflatable chamber and a distal end removably covered by an airtight cap;
   an outer foldable panel;
   an inner foldable panel, wherein the inner foldable panel comprises a proximal and a distal end;
   the outer foldable panel fixedly attached to the seat panel and the movable leg lift panel;
   the proximal end of the inner foldable panel fixedly attached to the non-moving panel;
   the distal end of the inner foldable panel also fixedly attached to the movable leg lift panel;
   the inflatable chamber attached on its front surface to the inner wall of the movable leg lift panel and on its proximal surface to the non-movable panel;
   the seat panel capable of resting on a surface of an airplane seat;
   the non-movable panel capable of being in close contact with the front surface of a standard airplane seat; and
   the inflatable chamber capable of being inflated whereby exerting a force to rotatably lift the movable leg lift panel thereby raising the lower legs of a passenger sitting on the seat panel.

2. A portable leg lift for an airplane seat as claimed in claim 1 wherein the inflation tube is attached to a rubber ball type air pump.

3. A portable leg lift for an airplane seat as claimed in claim 1 wherein the outer foldable panel includes a carry handle.

4. A portable leg lift for an airplane seat as claimed in claim 1 wherein the seat panel and the movable leg lift panel can be folded in book like fashion for compact storage and transport.

5. A portable leg lift for an airplane seat as claimed in claim 1 wherein the inflatable chamber is made in an accordion type fashion allowing additional leg lifting ability.

6. A portable leg lift for an airplane seat as claimed in claim 1 wherein the seat panel is semi-rigid.

7. A portable leg lift for an airplane seat as claimed in claim 1 wherein the movable leg lift panel is rigid.

8. A portable leg lift for an airplane seat as claimed in claim 7 wherein the movable rigid panel includes a cushion panel fixedly attached to its distal surface to allow more comfort for the passenger's lower legs.

* * * * *